United States Patent
Greco

(10) Patent No.: US 11,655,964 B2
(45) Date of Patent: May 23, 2023

(54) FILM, ILLUMINATION DEVICE, PROJECTOR COLOR WHEEL AND METHOD OF MANUFACTURING A FILM

(71) Applicant: Sony Group Corporation, Tokyo (JP)

(72) Inventor: Tonino Greco, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/372,517

(22) Filed: Jul. 12, 2021

(65) Prior Publication Data
US 2022/0018520 A1   Jan. 20, 2022

(30) Foreign Application Priority Data

Jul. 14, 2020   (EP) .................................... 20185773

(51) Int. Cl.
| | | |
|---|---|---|
| *F21V 9/32* | (2018.01) | |
| *F21V 14/08* | (2006.01) | |
| *C09K 11/88* | (2006.01) | |
| *C09K 11/08* | (2006.01) | |
| *C09K 11/02* | (2006.01) | |

(Continued)

(52) U.S. Cl.
CPC ................ *F21V 9/32* (2018.02); *C09K 11/02* (2013.01); *C09K 11/0883* (2013.01); *C09K 11/883* (2013.01); *F21V 14/08* (2013.01); *B82Y 20/00* (2013.01); *B82Y 40/00* (2013.01)

(58) Field of Classification Search
CPC ........... F21V 9/32; F21V 14/08; C09K 11/02; C09K 11/0883; C09K 11/883; B82Y 20/00; B82Y 40/00
See application file for complete search history.

(56) References Cited

U.S. PATENT DOCUMENTS

| | | | |
|---|---|---|---|
| 2005/0156180 A1 | 7/2005 | Zhang | |
| 2006/0244358 A1* | 11/2006 | Kim .................... | C09K 11/7734 313/486 |

(Continued)

FOREIGN PATENT DOCUMENTS

| | | |
|---|---|---|
| EP | 2574967 A1 | 4/2013 |
| EP | 2579073 A1 | 4/2013 |

(Continued)

OTHER PUBLICATIONS

Jun Xu; et al. "Quantum dots confined in nanoporous alumina membranes" Applied Physics Letters 89, 133110 2006, https://www.researchgate.net/publication/234987525_Quantum_dots_confined_in_nanoporus_alumina_membranes.

(Continued)

*Primary Examiner* — Tracie Y Green
(74) *Attorney, Agent, or Firm* — Xsensus LLP

(57) ABSTRACT

A film for changing a wavelength of light, including: a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern; a plurality of first quantum dots of a first quantum dot type, provided in the plurality of pores; and a plurality of second quantum dots of a second quantum dot type, provided in the plurality of pores.

18 Claims, 10 Drawing Sheets

(51) Int. Cl.
    *B82Y 20/00*    (2011.01)
    *B82Y 40/00*    (2011.01)

(56)             References Cited

U.S. PATENT DOCUMENTS

| | | | |
|---|---|---|---|
| 2007/0077525 A1* | 4/2007 | Davis | G11B 23/0021 |
| 2008/0173886 A1 | 7/2008 | Cheon | |
| 2009/0085473 A1* | 4/2009 | Iizumi | H01L 51/0012 |
| | | | 313/504 |
| 2017/0306227 A1* | 10/2017 | Ippen | C09K 11/02 |
| 2018/0011231 A1 | 1/2018 | Jiang | |
| 2018/0187070 A1 | 7/2018 | Chou et al. | |
| 2018/0299755 A1 | 10/2018 | Chou et al. | |
| 2020/0295239 A1* | 9/2020 | Song | H01L 33/504 |
| 2021/0017446 A1* | 1/2021 | Nie | C09K 11/88 |
| 2021/0130683 A1* | 5/2021 | Zhang | C09K 11/565 |

FOREIGN PATENT DOCUMENTS

| | | |
|---|---|---|
| KR | 2017-0066782 A | 6/2017 |
| KR | 101869230 B1 * | 7/2018 |
| WO | 2006/034561 A1 | 4/2006 |

OTHER PUBLICATIONS

Zhichun Li et al., "General Method for the Synthesis of Ultrastable Core/Shell Quantum Dots by Aluminum Doping", Journal of the American Chemical Society, vol. 137, No. 39, Oct. 7, 2015, pp. 12430-12433, XP055867946, ISSN: 0002-7863, DOI: 10.1021/jacs.5b05462 Retrieved from the Internet: URL:https://pubs.acs.org/doi/pdf/10.1021/jacs.5b05462.

Dea Uk Lee et al., "Microstructural and optical properties of CdSe/CdS/ZnS core-shell-shell quantum dots", Optics Express A350, vol. 24, No. 2, Jan. 25, 2016, total 8 pages, XP055867949, DOI: 10.1364/0E.24.00A350.

Yu-Ho Won et al., "Highly efficient and stable InP /ZnSe/ZnS quantum dot light-emitting diodes", Nature, Nature Publishing Group UK, London, vol. 575, No. 7784, Nov. 28, 2019, pp. 634-638, total 18 pages, XP036929587, Issn: 0028-0836, DOI: 10.1038/S41586-019-1771-5.

* cited by examiner

A
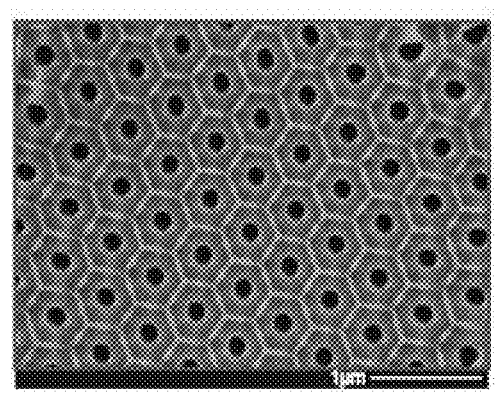
B
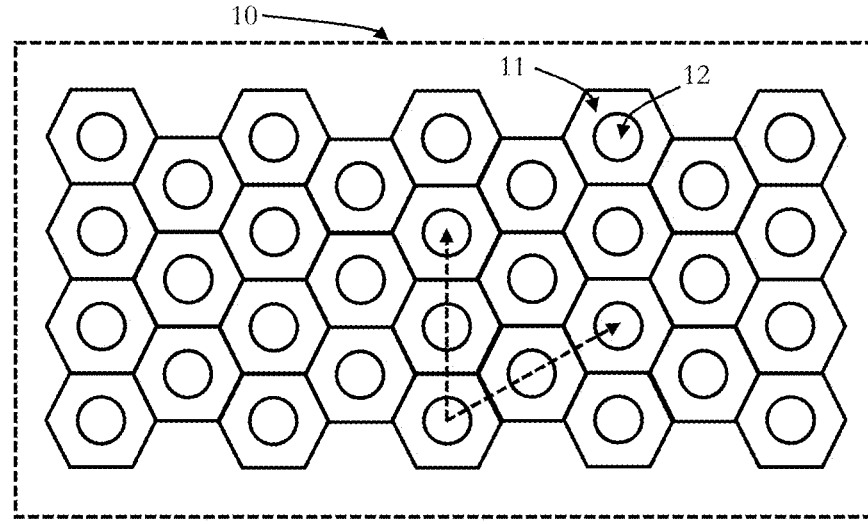
C
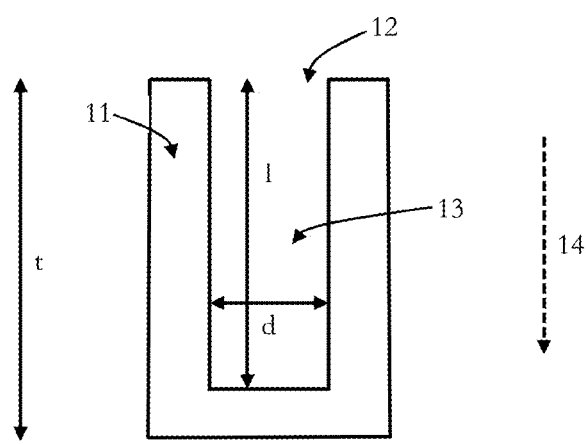
Fig. 1

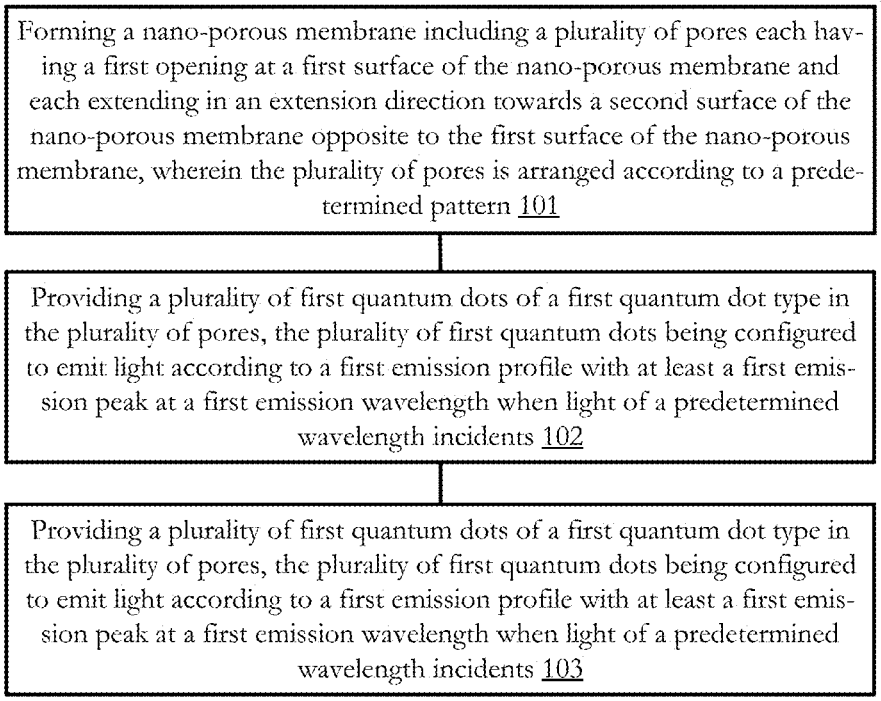

Forming a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern 101

Providing a plurality of first quantum dots of a first quantum dot type in the plurality of pores, the plurality of first quantum dots being configured to emit light according to a first emission profile with at least a first emission peak at a first emission wavelength when light of a predetermined wavelength incidents 102

Providing a plurality of first quantum dots of a first quantum dot type in the plurality of pores, the plurality of first quantum dots being configured to emit light according to a first emission profile with at least a first emission peak at a first emission wavelength when light of a predetermined wavelength incidents 103

Fig. 12

FILM, ILLUMINATION DEVICE, PROJECTOR COLOR WHEEL AND METHOD OF MANUFACTURING A FILM

CROSS-REFERENCE TO RELATED APPLICATION

This application claims priority from EP 20185773.7, filed on Jul. 14, 2020, the contents of which are incorporated by reference herein in its entirety.

TECHNICAL FIELD

The present disclosure generally pertains to a film for changing a wavelength of light and a method of manufacturing such a film, an illumination device and a projector color wheel.

TECHNICAL BACKGROUND

In recent years various luminescent films were investigated for a wide range of applications including, for example, phosphor color wheels in projector devices, quantum dot color filters for LCD (Liquid Crystal Display) front planes, organic light emitting diodes (OLEDs) in electroluminescence devices, luminescence solar concentrators for photovoltaic devices, and scintillators in nuclear radiation detection systems.

However, for the applications of planar luminescent films a major part of light is trapped in the films by the total internal reflection due to high refractive indices forming in-plane guided-wave modes. Additionally, light emitted from luminescent films typically follows a Lambertian angular profile without specific directionality.

With the development of nanotechnology, novel nanostructures have attracted increasing interest for their potential applications in a variety of fields including, for example, optical modulators, photovoltaic devices, and light emission devices.

Some nanostructures can achieve efficient control of light based on the modulation of optical dispersion relations or optical mode density of states, for example, photonic crystals formed with an array of monolayer polystyrene microspheres have been applied. Generally, two-dimensional photonic crystals can also be used to control the directionality of light emission based on the theory of guided-mode resonances.

Several manufacturing or fabrication methods are known among which the most frequently used for photonic structures on the nanoscale are, for example, direct-writing lithography, self-assembly, nanoimprint and interference lithography, however, each method has its own characteristics.

Although there exist techniques of films for changing a wavelength of light and of manufacturing such a film, illumination devices and projector color wheels, it is generally desirable to improve the existing techniques.

SUMMARY

According to a first aspect the disclosure provides a film for changing a wavelength of light, comprising:
a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;
a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
wherein the first emission wavelength is larger than the second emission wavelength.

According to a second aspect the disclosure provides an illumination device, comprising:
a light source configured to emit light of at least a predetermined wavelength; and
a film for changing a wavelength of light, provided on the light source, including:
a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
a plurality of first quantum dots of a first quantum dot type, provided in the plurality of pores, the plurality of first quantum dots being configured to emit light according to a first emission profile with at least a first emission peak at a first emission wavelength when light of the predetermined wavelength incidents;
a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
wherein the first emission wavelength is larger than the second emission wavelength.

According to a third aspect the disclosure provides a projector color wheel, comprising:
a substrate;
a reflective film provided on the substrate; and
a first film for changing a wavelength of light, provided on the reflective film, including:
a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;

a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

According to a fourth aspect the disclosure provides a method of manufacturing a film for changing a wavelength of light, comprising:

forming a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;

providing a plurality of first quantum dots of a first quantum dot type in the plurality of pores, the plurality of first quantum dots being configured to emit light according to a first emission profile with at least a first emission peak at a first emission wavelength when light of a predetermined wavelength incidents;

providing a plurality of second quantum dots of a second quantum dot type in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

Further aspects are set forth in the dependent claims, the following description and the drawings.

BRIEF DESCRIPTION OF THE DRAWINGS

Embodiments are explained by way of example with respect to the accompanying drawings, in which:

FIG. 1 illustrates an embodiment of a nano-porous membrane, in which: FIG. 1A shows an image of a nano-porous membrane, FIG. 1B schematically illustrates an embodiment of a predetermined pattern of a nano-porous membrane and FIG. 1C schematically illustrates in a block diagram an embodiment of a pore of a nano-porous membrane;

FIG. 12 schematically illustrates in a flow diagram an embodiment of a method of manufacturing a film for changing a wavelength.

DETAILED DESCRIPTION OF EMBODIMENTS

Figure 3:
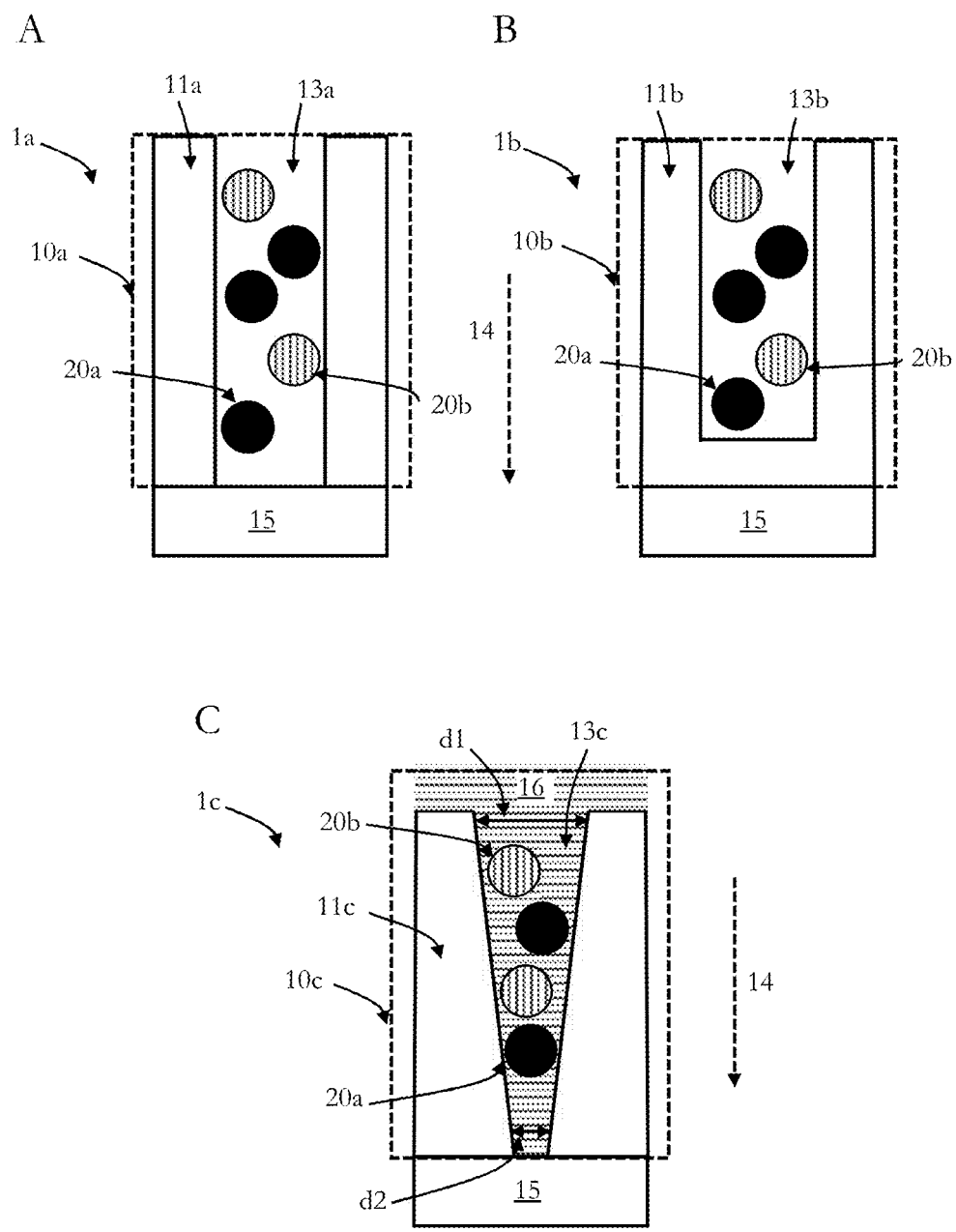
FIG. 3 schematically illustrates in a block diagram three embodiments of a film for changing a wavelength of light.

Before a detailed description of the embodiments under reference of FIG. 3 is given, general explanations are made.

As mentioned in the outset, for the applications of planar luminescent films a major part of light may be trapped in the films by the total internal reflection due to high refractive indices forming in-plane guided-wave modes which may be difficult to collect by photodetectors. Additionally, light emitted from the films typically follows a Lambertian angular profile without specific directionality and, thus, may be difficult to extract for the use of that luminescence light.

With the development of nanotechnology, novel nanostructures have attracted increasing interest for their potential applications in a variety of fields including, for example, optical modulators, photovoltaic devices, and light emission devices.

Moreover, as also mentioned in the outset, several manufacturing or fabrication methods are known among which the most frequently used for photonic structures on the nanoscale are, for example, direct-writing lithography, self-assembly, nanoimprint and interference lithography, however, each method has its own characteristics.

For instance, electron beam lithography is a direct writing technique which can obtain high resolution nanostructures, but may have, e.g., high fabrication cost compared to other methods, as it is generally known. The self-assembly method enables large-area fabrication, but, for example, a periodic array may not be perfectly periodic in the whole region, as it is generally known.

It has been recognized that, for example, highly ordered anodic aluminum oxide nano-porous membranes may be used as host matrix for photonic applications, since such nano-porous membranes can be manufactured in controllable manner.

Moreover, it has further been recognized that when a fluorescent material may be embedded into such a nano-porous membrane, i.e. host matrix, an efficient luminescent film for light wavelength-changing applications may be obtained and a directed light emission from the surface of the nano-porous membrane may be achieved.

Additionally, it has further been recognized that quantum dots may be embedded in the pores of the nano-porous membrane as an efficient fluorescent material, since, typically, quantum dots emit light according to a narrow emission profile and have a short fluorescence lifetime in the nanosecond time domain compared to other luminescent materials typically used.

Hence, some embodiments pertain to a film for changing a wavelength of light, including:

a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;

a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;

a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

The film may be used in photonic applications (for changing a wavelength), for example, in illumination devices, in laser illuminated projectors as a film provided on a projector color wheel, display devices, photodetectors etc. without limiting embodiments to these applications.

The film may be a plate-shaped three-dimensional body having lateral dimensions larger than a thickness of the film (e.g. the film thickness may be tens of micrometers and the lateral dimensions may be in the millimeter range or the like) without limiting the disclosure in this regard.

The nano-porous membrane may be a plate-shaped three-dimensional body composed of at least one base material including a plurality of three-dimensional cells each having a pore inside where none of the at least one base material is present. The pores are surrounded by walls of the corresponding cell of the at least one base material (except for embodiments in which a pore is intentionally filled with a (filling) material, as will be described further below). The plurality of cells each including a pore constitutes (the body of the) the nano-porous membrane and is arranged according to a predetermined pattern.

The (body of the) nano-porous membrane has a first surface which is, in some embodiments, of planar shape and spanned in lateral directions of the film.

The shape of each cell in a cross section parallel to the first surface of the nano-porous membrane may be a hexagon, a rectangle, a square and the like.

The at least one base material may be anodic aluminum oxide or anodic titanium oxide or the like.

A pore is a three-dimensional region in each cell where none of the at least one base material is present (except for embodiments in which a pore is intentionally filled with a (filling) material, as will be described further below) surrounded by walls of the corresponding cell.

The shape of each pore in the cross section parallel to the first surface of the nano-porous membrane may be a circle, an ellipse, a square, a hexagon and the like.

A pore diameter of the pore may be the radius of a circular cross section or, for example, the smallest dimension of the cross-sectional shape such as the small semi-axis of an elliptical cross section, the small side of a rectangular cross section and the like.

Each pore has a first opening at the first surface of the nano-porous membrane and each extending in an extension direction towards a second surface of the nano-porous membrane opposite to the first surface of the nano-porous membrane.

The extension direction may be a direction which is different from the lateral directions, in other words, the extension direction cannot be obtained by a linear combination of vectors corresponding to the lateral directions. The extension direction may be perpendicular to the first surface or may be tilted with respect to the first surface.

The second surface of the nano-porous membrane may be parallel to the first surface.

The predetermined pattern may be a periodic pattern in at least one lateral direction without limiting the disclosure in this regard.

The predetermined pattern may be predetermined by the manufacturing method and, thus, typical manufacturing-related deviations from an average value of cell shape, pore shape, pore diameter and the like and from a strict periodic pattern, i.e. arrangement, of the cells and pores still fall under the scope of the present disclosure.

Moreover, any other typical manufacturing-related deviations from, for example, a strict planarity, a strict parallel arrangement of the first and the second surface and the like still fall under the scope of the present disclosure.

In the following, for enhancing the general understanding of the present disclosure, an embodiment of nano-porous membrane is described under reference of FIG. 1.

FIG. 1A shows a scanning electron microscopy (SEM) image in view on a first surface of a nano-porous membrane.

The nano-porous membrane is formed of anodic aluminum oxide, wherein the nano-porous membrane is constituted by a plurality of hexagonal cells.

Each of the plurality of hexagonal cells has a pore having a first opening (black circles) at the first surface, wherein each pore has a circular cross-sectional shape.

The plurality of pores is arranged according to a predetermined pattern (here a periodic pattern according to the manufacturing method, as will be described further below).

FIG. 1B schematically illustrates an embodiment of a predetermined pattern of a nano-porous membrane 10.

The nano-porous membrane 10 is schematically illustrated in view on a first surface of the nano-porous membrane 10. The dashed box illustrates that only a small section of the nano-porous membrane is shown.

The nano-porous membrane 10 is formed of anodic aluminum oxide. The nano-porous membrane 10 has a plurality of cells 11 each having a pore having a first opening 12 at the first surface.

The cells 11 and the corresponding pores are arranged according to a predetermined pattern, here a periodic pattern in two lateral directions, wherein the lateral directions are illustrated by the dashed arrows.

FIG. 1C schematically illustrates in a block diagram an embodiment of a pore 13 of the nano-porous membrane 10 of FIG. 1B.

The schematic illustration corresponds to a cross section taken along an extension direction 14 of the nano-porous membrane 10, wherein the extension direction 14 is perpendicular to the lateral directions in FIG. 1B.

For illustration purposes only a single cell 11 of the nano-porous membrane 10 of FIG. 1B is depicted.

The pore 13 has a pore diameter d, which is substantially constant along the extension direction 14 of the pore 13.

The pore 13 has a pore length l, which is smaller than a membrane thickness t (l<t) along the extension direction 14 of the nano-porous membrane 10.

Figure 11:
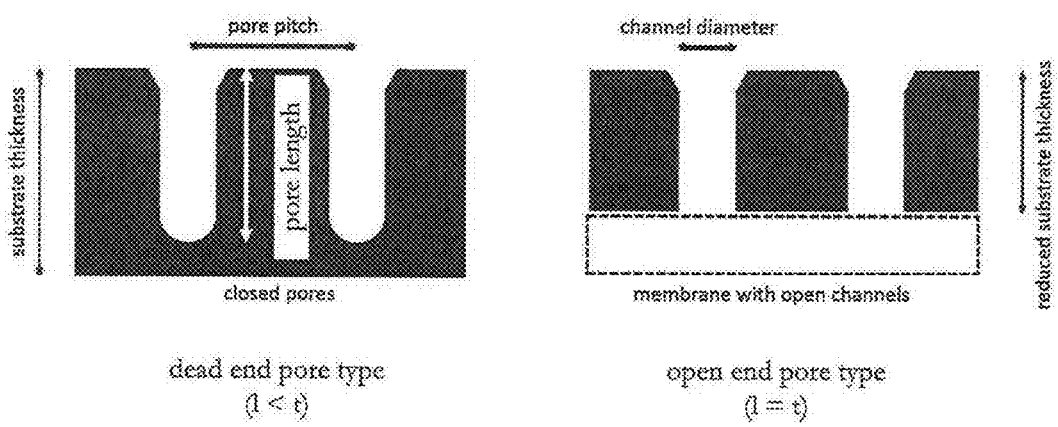
FIG. 11 schematically illustrates in a block diagram two different types of a nano-porous membrane.

The nano-porous membrane 10 including the plurality of such pores 13 is called a "dead end membrane" (see also left side of FIG. 11). If the pore length is equal to the membrane thickness (l=t), the nano-porous membrane is called an "open membrane" (see also right side of FIG. 11).

Returning to the general explanations, in some embodiments, the nano-porous membrane is manufactured by two-step anodization, as generally known. In such embodiments, at least a periodicity, a pore length and a pore diameter can be controlled by a voltage introduced during the anodization and a subsequent pore-widening time.

In some embodiments, the nano-porous membrane is formed from a single starting material (e.g. an aluminum film) by two-step anodization resulting in a nano-porous membrane composed of at least the anodic aluminum oxide (aluminum residuals may still be present).

As a result, nano-porous membranes such as anodic aluminum oxide membranes may be processed standardly in a self-ordered regime.

In some embodiments, the pores are etched in a high ordered regime with a periodic arrangement which results in a narrow pore length and pore diameter distribution at a fixed pore distance (which is a distance between two pores of neighboring cells as shown in FIG. 11).

In some embodiments, the (raw) nano-porous membrane obtained from two-step anodization is further processed, for example, to further structure the shape of the pores. The structuring may be performed by controlling parameters of the two-step anodization or by known chemical etching methods, ion etching, lithography techniques and the like.

The film includes a plurality of first quantum dots of a first quantum dot type provided in the plurality of pores. The plurality of first quantum dots may be distributed equally among the plurality of pores or may be distributed unequally among the plurality of pores. Some of the plurality of pores may not contain any of the plurality of first quantum dots.

The film includes a plurality of second quantum dots of a second quantum dot type provided in the plurality of pores. The plurality of second quantum dots may be distributed equally among the plurality of pores or may be distributed unequally among the plurality of pores. Some of the plurality of pores may not contain any of the plurality of second quantum dots.

Generally, quantum dots are known, which are, in some embodiments, semiconductor particles in the nanometer range having optical and electronic properties that differ from larger particles. In a quantum dot the motion of electrons and holes is typically confined by the bandgap structure of the semiconductor materials of which the quantum dot is composed leading to discrete electronic states. Typically, quantum dots manufactured by colloidal synthesis have an optically active core and a protective layer formed on the core. The electronic states and, thus, the optical absorption and emission properties (e.g. absorption band, emission profile, emission peaks and corresponding emission wavelengths) can be controlled, in some embodiments, by the size of the core part and the protective layer and their material composition.

The first and the second quantum dot type may each have a multi-shell, i.e. multi-layer, quantum dot structure of at least three layers (core layer of a first quantum dot material, shelling layer of a second quantum dot material and an oxide layer of an oxide) each layer including at least one of a number of possible quantum dot materials or oxides, as will be described further below.

The plurality of first and second quantum dots of the first and second quantum dot type, respectively, may be produced by known preparation methods for quantum dots such as colloid synthesis.

The plurality of first quantum dots is configured to emit light according to a first emission profile with at least a first emission peak at a first emission wavelength when light of a predetermined wavelength incidents. The plurality of second quantum dots is configured to emit light according to a second emission profile with at least a second emission peak at a second emission wavelength when light of the predetermined wavelength incidents, wherein the first emission wavelength is larger than the second emission wavelength.

A brief introduction in the light absorption and emission process in semiconductor quantum dots is given in the following, which may be present in some embodiments. In semiconductor quantum dots, light absorption may lead to an electron being excited from the valence to the conduction band, leaving behind a hole. The electron and the hole, for example, may bind to each other to form an exciton. When this exciton recombines (i.e. the electron resumes its ground state), the exciton's energy may be emitted as light. Typically, this may be possible from a number of bounded exciton states such that a number of radiative transitions are possible. Moreover, other radiative transitions may be allowed in semiconductor quantum dots. Generally, each radiative transition may not be restricted to a single wavelength due to broadening mechanisms such as at least natural broadening.

Hence, the probability that a certain wavelength is emitted (from a single quantum dot after absorption of incident light) may depend on the probability of the corresponding radiative transition of an electron and a hole and, thus, the optical power emitted by the plurality of quantum dots after excitation varies according to the emission profile in some embodiments. Accordingly, the emission profile may be understood as the integrated optical power recorded for a plurality of wavelengths in a wavelength range over a certain time interval, wherein the optical power may be emitted by a plurality of quantum dots when a predetermined wavelength incident. In addition, production-related variations, for example, in the size of the quantum dots may contribute to the emission profile and, accordingly, the emission profile may basically reflect an ensemble property of a plurality of quantum dots.

Typically, the emission profile of a material has at least one emission peak which may originate from the lowest radiative electronic state (optically allowed transition) and, as described above for the example of quantum dots, a continuum of wavelengths may be emitted, i.e. emission peak, and each wavelength may be emitted with a certain probability. In some embodiments, the emission peak is present at a certain emission wavelength (e.g. a maximum of the peak, a certain wavelength in a wavelength interval characterizing the emission peak such as the full-width-at-half-maximum, or the like), which may correspond to the energy difference between the energy of the radiative state and the ground state (for example energy difference of the electron and hole state). In some embodiments, the emission wavelength corresponds to the wavelength where a maximum of the emission peak is present (is recorded).

In some embodiments, the first and the second quantum dot type each has a structure which includes:
- a core layer including a first quantum dot material;
- a first shelling layer including a second quantum dot material formed on the core layer; and
- an oxide layer including an oxide formed on the first shelling layer.

The first quantum dot material and the second quantum dot material may be or may include at least one of cadmium selenide (CdSe), cadmium sulfide (CdS), CdTe, zinc selenide (ZnSe), ZnS, ZnTe, GaAs, GaP, GaSb, indium phosphide (InP), InAs, InSb, HgS, HgSe, HgTe, AlAs, AlP, AlSb or any combinational proportion thereof (e.g. $In_xGa_{1-x}P$, $ZnSe_xTe_{1-x}$, $ZnSe_xS_{1-x}$).

The first oxide may be or may include a metal oxide or semiconductor oxide such as aluminum oxide ($Al_2O_3$), $SiO_2$, $TiO_2$, $ZrO_2$ or ZnO or the like or an earth alkali oxide MO, wherein M stands for one of Mg, Ca, Sr and Ba. Moreover, the oxide may be or may include a sodium aluminate ($Na_xAl_yO_z$) which can be obtained from aqueous alkaline aluminate solutions, for example, $NaAlO_2$ or $NaAl_{11}O_7$ (sodium-β-aluminate). The oxide may be or may include a potassium aluminate, for example, $KAlO_2$, $K_3AlO_3$, $K_5AlO_4$, $K[Al(OH)_4]$ or $K_3[Al(OH)_6]$ (potassium hydroxy aluminate). The oxide may be or may include an earth alkali fluoride ($MF_2$) or sulphate ($MSO_4$) or phosphate ($M_3PO_4$), wherein M stands for one of Mg, Ca, Sr and Ba. The oxide may be or may include an alkali yttrium fluoride ($MYF_4$, wherein M stands for one of K, Na and Li), an yttrium vanadate ($YVO_4$), a lanthanum vanadate ($LaVO_4$) or a yttrium borate ($YBO_3$).

In some embodiments, the structure of the first and the second quantum dot type includes:

a second shelling layer including a third quantum dot material formed between the first shelling layer and the oxide layer.

The third quantum dot material may be or may include at least one of cadmium selenide (CdSe), cadmium sulfide (CdS), CdTe, zinc selenide (ZnSe), ZnS, ZnTe, GaAs, GaP, GaSb, indium phosphide (InP), InAs, InSb, HgS, HgSe, HgTe, AlAs, AlP, AlSb or any combinational proportion thereof (e.g. $In_xGa_{1-x}P$, $ZnSe_xTe_{1-x}$, $ZnSe_xS_{1-x}$).

In some embodiments, a first and a second quantum dot type each has a structure of a core layer including CdSe, a first shelling layer including CsS and a second shelling layer including ZnS (the first oxide may be $SiO_2$ or any other of the above-mentioned materials).

In other embodiments, a first and a second quantum dot type each has a structure of a core layer including InP, a first shelling layer including ZnSe and a second shelling layer including ZnS (the first oxide may be $SiO_2$ or any other of the above-mentioned materials).

In some embodiments, a first or second quantum dot type each has a structure of a CdSe/CdS/ZnS/$SiO_2$ system with an overall dot diameter in the range of 20-49 nm. The optically active core layer including CdSe, in this embodiment, has a thickness (in diameter) of 4 nm. The first shelling layer including CdS, in this embodiment, has a thickness of 11 nm, resulting in a core-shell quantum dot of 15 nm. The second shelling layer including ZnS, in this embodiment, has a thickness of 1 nm. The oxide layer including $SiO_2$, in this embodiment, has a thickness of 4-33 nm.

In other embodiments, an InP/ZnSe/ZnS/$Al_2O_3$ multi-shell quantum dot is used as a cadmium-free alternative.

In some embodiments, the first quantum dot material is cadmium selenide and the second quantum dot material is cadmium sulfide.

In some embodiments, the first quantum dot material is indium phosphide, the second quantum dot material is zinc selenide and the third quantum dot material is zinc sulfide.

In some embodiments, the oxide is silicon oxide or aluminum oxide.

Generally, the structure of the first and second quantum dot type may have the same or of a different material composition. Hence, in some embodiments, the emission wavelength (and the absorption) is tuned by the material composition and/or by the size or thickness of each material layer (e.g. core and protective layer(s)).

Generally, using multi-shell quantum dots may cause the narrow emission profile (typically <35 nm) and a short fluorescence lifetime in the nanosecond time domain compared to other luminescent materials typically used.

Moreover, a plurality of quantum dots of a multi-layer quantum dot type may improve, e.g., fluorescence (emission) quantum yield (i.e. the number of emitted photons per absorbed photons).

The shelling layers may be composed of a material with a larger bandgap semiconductor material than the core, which may reduce the access of generated electrons and holes to non-radiative surface recombination pathways.

Moreover, the oxide (layer) may prevent the core and shelling layers to burn under oxygen atmosphere (e.g. in high power applications).

Furthermore, the multi-layer quantum dot type may prevent self-quenching of the excited quantum dots due to an increased distance between the cores of neighboring quantum dots, thereby the wavelength-changing efficiency may be increased.

Figure 2:
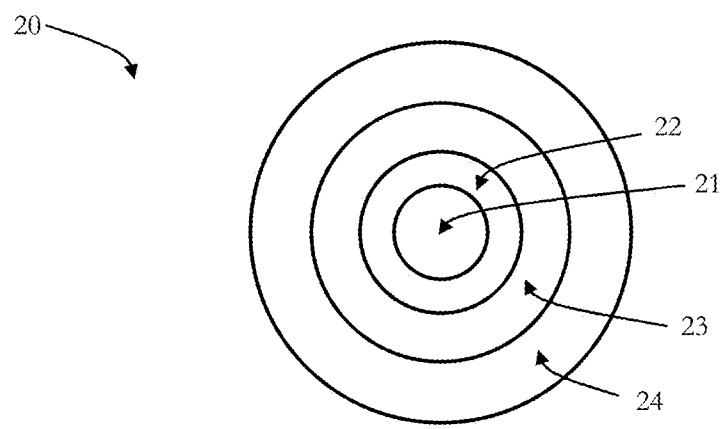
FIG. 2 schematically illustrates an embodiment of a structure of a first and a second quantum dot type.

For enhancing the general understanding of a structure of a quantum dot implemented in some embodiments of the present disclosure, in the following a general structure of a quantum dot is explained under reference of FIG. 2, which schematically illustrates an embodiment of a structure 20 of a first and second quantum dot type.

The structure 20 includes a core layer 21, a first shelling layer 22, a second shelling layer 23 and an oxide layer 24.

The first shelling layer 22 is formed on the core layer 21. The oxide layer 24 is formed on the first shelling layer 22. The second shelling layer 23 is formed between the first shelling layer 22 and the oxide layer 24.

The core layer 21 includes a first quantum dot material, the first shelling layer includes a second quantum dot material, the second shelling layer includes a third quantum dot material and the oxide layer 24 includes an oxide.

As mentioned above, a plurality of first quantum dots of a first quantum dot type and a plurality of second quantum dots of a second quantum dot type is provided in a plurality of pores of a nano-porous membrane (i.e. host matrix for the quantum dots).

The use of a nano-porous membrane as a host matrix may allow to control parameters of the membrane (e.g. pore diameter and periodicity), the thermal stability of the host matrix and the dissipation of heat, which is generated in the plurality of quantum dots by absorption of incident light of at least a predetermined wavelength (for example, the excess energy between absorption and emission may be converted into heat). The heat may be dissipated by the walls of the cell (e.g. anodic aluminum oxide has a high thermal conductivity). This may be useful, e.g., in high power applications such as in laser or LED illuminated projectors where the film including the nano-porous membrane is used on a projector color wheel.

Moreover, due to the high refractive index of the cell walls (e.g. n=1.7 for $Al_2O_3$) the light emitted by the plurality of quantum dots after absorption of light may be efficiently coupled out of the nano-porous membrane (from each of the pores) by total internal reflection at the cell walls.

Additionally, due to the pore structure the light may be coupled out in a directed manner (i.e. directional surface emission).

Moreover, the use of a nano-porous membrane as fluorophore-host-matrix may improve the luminescence efficiency.

In some embodiments, the directional emission of the film is used for incoupling into waveguides. This may be beneficial because the reduced emission cone angle may lead to a reduced portion of incoupled radiation, which may get lost otherwise through outcoupling at the waveguide surface under the escape cone angle conditions.

Furthermore, the use of quantum dots having a multi-layer structure, as described herein, may be required when provided in a nano-porous membrane, since the average distance of the quantum dots in a pore may typically be small which would lead to a high self-quenching of excited quantum dots with a small dot diameter (e.g. quantum dots with only two layers).

Therefore, the use of quantum dots having a multi-layer structure, as described herein, may increase the efficiency of the wavelength-changing process.

Moreover, the use of an oxide layer may cause, on the one hand, that the oxide may increase the overall stability of the quantum dots and on the other hand that the oxide may prevent the core and the shelling layers from getting oxidized (e.g. photobleaching), in other words, from starting to burn, for example, in high power applications.

Therefore, the oxide layer may increase the stability of the quantum dots.

In some embodiments, the plurality of first and second quantum dots is manufactured, by colloidal synthesis, as mentioned above. In colloidal synthesis the quantum dots may be formed from solutions, e.g. in a solvent, and many different types of semiconductor nanocrystals (e.g. quantum dots) can be manufactured, as generally known.

The plurality of first quantum dots and the plurality of second quantum dots may be produced in the same solution or may be produced in separate solutions.

The solvent may be one of an unpolar solvent such as an alkane, an alkene, tuluol, chloroform or the like or a combination (mixture) thereof. The solvent may be one of a polar solvent such as an alcohol, an acetamide, a formamide, an ester, water, or the like or a combination (mixture) thereof.

In some embodiments, the solvent is a volatile solvent such as ethanol, hexane, chloroform or the like or a combination (mixture) thereof.

In some embodiments, once the formation of the quantum dots is finished, the quantum dots are provided in the nano-porous membrane.

In some embodiments, the quantum dots are provided in the membrane by applying the solution on the membrane so that the pores are filled with the solution. In such embodiments, the solvent is evaporated afterwards.

In some embodiments, the quantum dots are provided in the membrane by filtering the solution (the quantum dot dispersion) through the nano-porous membrane so that quantum dots may stick at the surface of the cell walls of the pore. In such embodiments, the membrane is an "open membrane".

By embedding a plurality of first and second quantum dots in pores of a nano-porous membrane a number of different design options may be realized, as described in the following.

In some embodiments, each of the plurality of pores has a second opening at the second surface of the nano-porous membrane by extending the respective pore in the extension direction to the second surface of the nano-porous membrane. In such embodiments, the membrane is an "open membrane".

In some embodiments, each of the plurality of pores has a pore diameter being substantially constant along the extension direction. In such embodiments, the three-dimensional shape of the pore is a cylinder.

In some embodiments, each of the plurality of pores has a pore diameter getting increasingly smaller from the first opening along the extension direction to the second opening. In such embodiments, the three-dimensional shape of the pore may be, for example, a truncated cone without limiting the disclosure in this regard.

Such pores may be manufactured by controlling operation parameters of the two-step anodization process in which the nano-porous membrane is formed, by further lithography steps, chemical etching methods (e.g. (anisotropic) wet chemical etching), ion etching, etc.

In some embodiments, using such a pore structure may allow a better control of the dot diameter of the quantum dots which remain inside the pores.

Generally, the dot diameter may vary in the solution which is filled in the membrane due to production-related deviations. When the pore diameter of the pore is getting increasingly smaller from the first opening to the second opening, the pore diameter at the second opening may set a lower limit of the dot diameter of the quantum dots.

Hence, in some embodiments, the pore diameter of each of the plurality of pores at the second opening is smaller than a dot diameter of each of the plurality of first quantum dots and each of the plurality of second quantum dots.

In some embodiments, the film for changing a wavelength of light further includes:
  a substrate on which the nano-porous membrane is provided; and
  wherein the second surface of the nano-porous membrane faces the substrate.

The substrate may be a support (e.g. a glass) and/or functional material (e.g. reflective such as a metal) on which the nano-porous membrane is provided.

In some embodiments, the substrate is a metallic substrate (e.g. alumina, silver, gold, etc.) or a transparent substrate (e.g. glass, quartz glass, aluminum oxide, plastic, etc.).

The different design options of the pores may have an influence on the procedure of the filling process as will be described in the following.

In some embodiments, the film is provided without a substrate.

In such embodiments, the "dead end membranes" are filled with the quantum dot solution followed by solvent evaporation.

In such embodiments, for "open end membranes" having a substantially constant pore diameter along the extension of the pore, the solution runs through the pores from the first opening to the second, in some embodiments, and the quantum dots may stick to the wall.

In such embodiments, for "open end membranes" having a pore diameter getting increasingly smaller, the solution runs through the pores from the first opening to the second opening and the quantum dots having a dot diameter larger than the pore diameter at the second opening may remain in the pore.

In some embodiments, the film is provided with a substrate.

In such embodiments, the substrate is provided before the filling process.

In such embodiments, the "dead end membrane" is filled with the quantum dot solution followed by solvent evaporation.

In such embodiments, for "open end membranes" having a substantially constant pore diameter along the extension of the pore, the quantum dot solution is filled in the pores and evaporated afterwards.

In such embodiments, for "open end membranes" having a pore diameter getting increasingly smaller, the substrate is provided (i.e. attached) after the above-described filtering process.

Generally, the quantum dot concentration in the pores of the nano-porous membrane may be controlled by adjusting the pore diameter and the pore distance (see FIG. 11).

The quantum dot concentration in the nano-porous membrane (host matrix) may be monitored by spectroscopic methods.

Moreover, the adsorption and immobilization of the hydrophilic metal oxide coated quantum dots (e.g. $SiO_2$ or $Al_2O_3$) onto the hydrophilic inner cell walls may be regulated by chemical methods like pH tuning or by chemical surface modification of both of the quantum dots and inner channel walls.

In some embodiments, the plurality of pores includes a plurality of first pores and a plurality of second pores and wherein the plurality of first quantum dots is provided in the plurality of first pores and wherein the plurality of second quantum dots is provided in the plurality of second pores. In such embodiments, quantum dots of the two types are placed in different pores.

In some embodiments, the plurality of first pores and the plurality of second pores is arranged according to an alternating sequence along a direction of the predetermined pattern.

In some embodiments, the plurality of first pores is arranged according to a plurality of first pore groups and the plurality of second pores is arranged according to a plurality of second pore groups, wherein the plurality of first pore groups and the plurality of second pore groups is arranged according to a predetermined sub-pattern of the predetermined pattern.

In such embodiments, the distribution of the plurality of first and second quantum dots in the respective pores of the nano-porous membrane may be manufactured by ink jet printing, electrostatic accelerated jetting technologies or by preparing a suitable mask and placing the mask on top of the nano-porous membrane when the respective quantum dot solution is filled in the pores or the like. The method of choice may depend on the required resolution.

Again, any production-related deviations from a strict alternating sequence or sub-pattern still fall under the scope of the present disclosure.

In some embodiments, the plurality of pores is filled with a metal oxide, a metal fluoride or a semiconductor oxide.

The filling material may be metal oxides or fluorides such as titania, alumina or magnesia or magnesium fluoride or the like.

The filling material may be inserted by, for example, magnetron sputtering due to the high deposition rate and purity of the materials.

This may offer an improved protection of the quantum dots towards environmental influences such as oxygen.

Moreover, the filling of the pores may further improve heat dissipation. In addition, it may decrease self-quenching of the excited quantum dots by restricting the motion of the quantum dots.

Generally, the film for changing a wavelength of light, as described herein, may provide at least one of the following:

directional surface emission for wavelength-changing applications, for example, conversion of blue light to white, green or red light;

better color gamut by using quantum dots compared to known luminescent films;

color-filter-less subpixel RGB arrays realizable;

better suitability for high power application due to enhanced thermal cooling by heat dissipation through, for example, anodic alumina oxide matrix and aluminum substrate as, for instance, in a color-converting phosphor wheel, i.e. projector color wheel; and better resistance to photobleaching because of effective matrix encapsulation.

Some embodiments pertain to an illumination device, including:

a light source configured to emit light of at least a predetermined wavelength; and a film, as discussed herein, for changing a wavelength of light, provided on the light source, including:

a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;

a plurality of first quantum dots of a first quantum dot type, provided in the plurality of pores, the plurality of first quantum dots being configured to emit light according to a first emission profile with at least a first emission peak at a first emission wavelength when light of the predetermined wavelength incidents;

a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

The light source may be a light emitting diode (LED), a LED array, a mini-LED, a monolithic micro-LED array, a laser, e.g., a laser diode, a laser diode array, etc.

Some embodiments pertain to a projector color wheel, including:

a substrate;

a reflective film provided on the substrate; and a first film, as discussed herein, for changing a wavelength of light, provided on the reflective film, including:

a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;

a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;

a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

The projector color wheel may be used in a laser illuminated projector for changing a wavelength of light without limiting embodiments to this case. When light of (at least) a predetermined wavelength incidents onto the projector color wheel, such as light from blue laser diode with e.g. 450 nm, the projector color wheel functions as a wavelength-changer of (the incident) light, i.e. the blue light incident generates light in the first films of wavelengths different from the incident light. The generated light can be used in the projector to generate an image projected onto a screen.

The projector color wheel may be a disk-shaped, flat cylindrical body or generally a flat rotation symmetrical body without limiting embodiments to this case, since the projector color wheel typically rotates in a laser illuminated projector. The projector color wheel may have a mount through an axis around which the body of the projector color wheel may be rotated.

The substrate may be made of a glass, a ceramic, a semiconductor, a metal or the like or a combination thereof. The substrate is basically a support material or support body on which a functional film is provided, wherein the functional film includes materials for changing a wavelength.

The reflective film may be a metallic film, wherein the metallic film may be of aluminum or silver or the like or a dielectric coating.

In some embodiments, the projector color wheel further includes:

a second film for changing a wavelength of light, provided on the first film, including a phosphor compound, the phosphor compound being configured to emit light according to a third emission profile with at least a third emission peak at a third emission wavelength when light of the predetermined wavelength incidents; and wherein each of the first film and the second film includes a binding material.

The phosphor compound may be cerium doped yttrium aluminum garnet (Ce:YAG; $Ce^{3+}:Y_3Al_5O_{12}$) or terbium and gadolinium instead of cerium, SiAlON phosphor, a $CaAlSiN_3$-based phosphor or the like.

Each of the first and the second film include a binding material. In some embodiments, the binding material is used for attaching the both films to each other.

The binding material may be sodium silicate ($Na_2SiO_3$). The binding material may be one of an aqueous solution of silicates having the general formula $M_2O*n\ SiO_2$, wherein M may be a cation of $Li^+$, $Na^+$, $K^+$, and ammonium cations $NR_4^+$ with R being an H-atom, an alkyl group, an alkylene group or a combination thereof. The binding material may be a sodium aluminate ($Na_xAl_yO_z$) which can obtained from aqueous alkaline aluminate solutions, for example, $NaAlO_2$ or $NaAl_{11}O_{17}$ (sodium-β-aluminate). The binding material may be a potassium aluminate, for example, $KAlO_2$, $K_3AlO_3$, $K_5AlO_4$, $K[Al(OH)_4]$ or $K_3[Al(OH)_6]$ (potassium hydroxy aluminate). The binding material may be an earth alkali fluoride ($MF_2$) or sulphate ($MSO_4$) or phosphate ($M_3PO_4$), wherein the M stands for one of Mg, Ca, Sr and Ba. The binding material may be an alkali yttrium fluoride ($MYF_4$ with M being one of K, Na and Li), a yttrium vanadate ($YVO_4$), a lanthanum vanadate ($LaVO_4$) or a yttrium borate ($YBO_3$).

Some embodiments pertain to a method of manufacturing a film, as discussed herein, for changing a wavelength of light, including:

forming a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;

providing a plurality of first quantum dots of a first quantum dot type in the plurality of pores, the plurality of first quantum dots being configured to emit light according to a first emission profile with at least a first emission peak at a first emission wavelength when light of a predetermined wavelength incidents;

providing a plurality of second quantum dots of a second quantum dot type in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

Returning to FIG. 3, which schematically illustrates in a block diagram three embodiments of a film for changing a wavelength. The three embodiments are discussed under reference of FIGS. 3 and 4. The same reference signs are used for components with basically the same configuration and functionality.

FIG. 3A schematically illustrates a first embodiment of a film 1a for changing a wavelength in a cross-sectional view along an extension direction 14.

The film 1a has a nano-porous membrane 10a (illustrated by the dashed box) and a substrate 15, wherein the nano-porous membrane 10a is provided on the substrate 15 with a second surface. In other words, the second surface of the nano-porous membrane 10a faces the substrate 15.

The nano-porous membrane 10a is formed of anodic aluminum oxide and the substrate 15 is an aluminum substrate.

A single cell 11a of the nano-porous membrane 10a is schematically illustrated (the nano-porous membrane 10a has a plurality of such cells 11a, but for illustration purposes only one single cell 11a is shown).

The cell 11a has a pore 13a with an "open end", wherein a pore diameter is substantially constant along the extension direction 14. The pore 13a has an opening at a first surface of the nano-porous membrane 10a, wherein the first surface nano-porous membrane 10a is the surface opposite to the second surface nano-porous membrane 10a. The pore 13a extends in the extension direction 14 towards the second surface of the nano-porous membrane 10a, wherein the pore 13a has an opening at the second surface of the nano-porous membrane 10a. The opening at the second surface of the nano-porous membrane 10a is obtained by extending the pore 13a in the extension direction 14 to the second surface of the nano-porous membrane 10a.

A plurality of first quantum dots 20a (black circles) and a plurality of second quantum dots 20b (circle with vertical stripes) is provided in the pore 13a. Accordingly, both the plurality of first and second quantum dots 20a and 20b is provided mixed in each pore 13a.

The plurality of first quantum dots 20a is of a first quantum dot type, which has a structure which includes: CdSe (core layer)/CdS (first shelling layer)/ZnS (second shelling layer)/$SiO_2$ (oxide layer).

The plurality of second quantum dots 20b is of a second quantum dot type, which has a structure which includes: InP (core layer)/ZnSe (first shelling layer)/ZnS (second shelling layer)/$Al_2O_3$ (oxide layer).

The emission wavelength (and the absorption) is tuned by the material composition and/or by the size or thickness of each material layer (e.g. core and protective layer(s)).

The plurality of first quantum dots 20a is configured to emit light according to a first emission profile with at least a first emission peak at a first emission wavelength when light of a predetermined wavelength incidents.

The plurality of second quantum dots 20b is configured to emit light according to a second emission profile with at least a second emission peak at a second emission wavelength when light of the predetermined wavelength incidents, wherein the first emission wavelength is larger than the second emission wavelength.

FIG. 3B schematically illustrates a second embodiment of a film 1b for changing a wavelength in a cross-sectional view along an extension direction 14.

The film 1b has a nano-porous membrane 10b (illustrated by the dashed box) and a substrate 15, wherein the nano-porous membrane 10b is provided on the substrate 15 with a second surface. In other words, the second surface of the nano-porous membrane 10a faces the substrate 15.

The nano-porous membrane 10b is formed of anodic aluminum oxide and the substrate 15 is an aluminum substrate.

A single cell 11b of the nano-porous membrane 10b is schematically illustrated (the nano-porous membrane 10b has a plurality of such cells 11b, but for illustration purposes only one single cell 11b is shown).

The cell 11b has a pore 13b with a "dead end", wherein a pore diameter is substantially constant along the extension direction 14.

FIG. 3C schematically illustrates a third embodiment of a film 1c for changing a wavelength in a cross-sectional view along an extension direction 14.

The film 1c has a nano-porous membrane 10c (illustrated by the dashed box) and a substrate 15, wherein the nano-porous membrane 10c is provided on the substrate 15 with a second surface. In other words, the second surface of the nano-porous membrane 10a faces the substrate 15.

The nano-porous membrane 10c is formed of anodic aluminum oxide and the substrate 15 is an aluminum substrate.

A single cell 11c of the nano-porous membrane 10c is schematically illustrated (the nano-porous membrane 10c has a plurality of such cells 11c, but for illustration purposes only one single cell 11c is shown).

The cell 11c has a pore 13c with an "open end". The pore 13c has an opening at a first surface of the nano-porous membrane 10c, wherein the first surface nano-porous membrane 10c is the surface opposite to the second surface nano-porous membrane 10c. The pore 13c extends in the extension direction 14 towards the second surface of the nano-porous membrane 10c, wherein the pore 13c has an opening at the second surface of the nano-porous membrane 10c. The opening at the second surface of the nano-porous membrane 10c is obtained by extending the pore 13c in the extension direction 14 to the second surface of the nano-porous membrane 10c.

The pore 13c has a pore diameter which is getting increasingly smaller from the first opening along the extension direction 14 to the second opening.

The pore diameter is getting linearly smaller from a first pore diameter (d1) at the first opening to a second pore diameter (d2) at the second opening. In other words, the pore 13c has a pore diameter gradient channel.

Moreover, the pore 13c is filled with a filling material 16, here $SiO_2$, for protecting the plurality of first quantum dots 20a and the plurality of second quantum dots 20b for environmental influences such as oxygen.

Each of the films 1a-c can be used in, e.g., an illumination device having a light source, e.g., a blue LED array.

Figure 4:
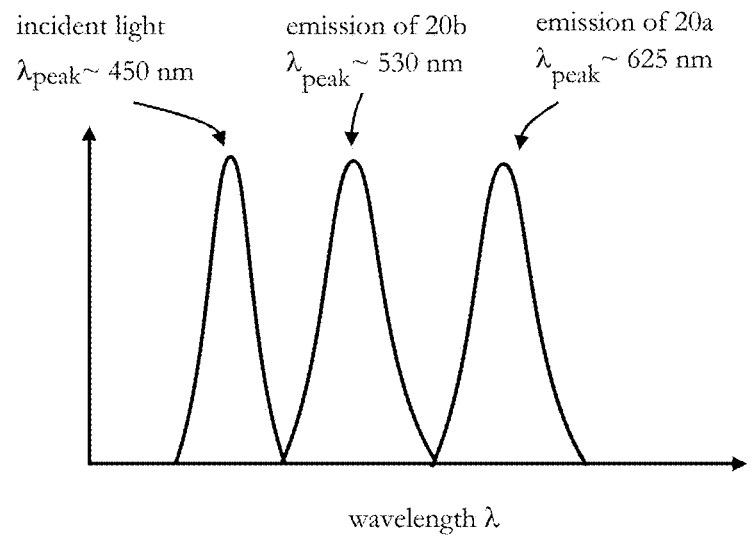
FIG. 4 schematically illustrates in a graph an embodiment of an optical output profile, a first emission profile with a first emission peak at a first emission wavelength of a plurality of first quantum dots and a second emission profile with a second emission peak at a second emission wavelength of a plurality of second quantum dots.

An exemplarily (spectral) optical output profile of the light source is shown schematically in FIG. 4 as the left graph, wherein the light emitted by the light source includes at least a predetermined wavelength of (about) 450 nm ("blue light"), wherein the light source is a LED array.

When one of the films 1a-c is used in the illumination device for changing a wavelength of light, the optical output profile of the light source incident onto the film 1a-c.

Then, the plurality of second quantum dots emits light according to a second emission profile, corresponding to the middle graph in FIG. 4, which has a (narrow) emission peak at a second emission wavelength of (about) 530 nm ("green light"). The plurality of first quantum dots 20a emits light according to a first emission profile, corresponding to the right graph in FIG. 4, which has a (narrow) emission peak at a first emission wavelength of (about) 625 nm ("red light").

Figure 5:
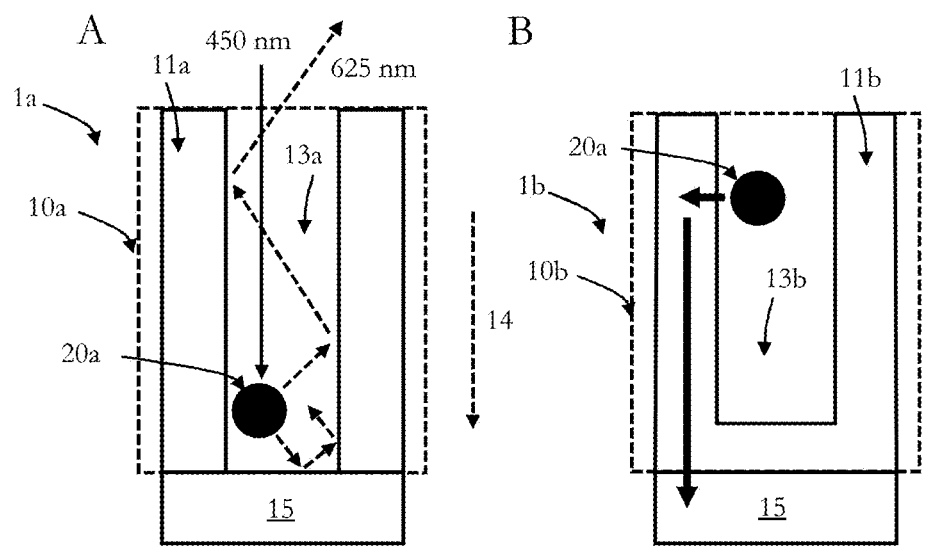
FIG. 5 schematically illustrates in a block diagram a light emission from a pore and a heat dissipation in a pore.

FIG. 5 schematically illustrates in a block diagram an embodiment of a light emission from a pore 13a and a heat dissipation in a pore 13b. The embodiment is discussed under reference of FIG. 4 and FIG. 5. The same reference signs are used for components with basically the same configuration and functionality.

FIG. 5A schematically illustrates the light emission from a pore 13a in a film 1a, which corresponds to the film 1a of the embodiment shown in FIG. 3A.

An exemplarily (spectral) optical output profile of a light source as shown schematically in FIG. 4 in the left graph, is incident onto the film 1a (black arrow), wherein the light emitted by the light source includes at least a predetermined wavelength of (about) 450 nm ("blue light"), wherein the light source is a LED array.

The plurality of first quantum dots 20a (for illustration purposes only one quantum dot is shown and the plurality of second quantum dots 20b is not shown) absorbs light of the predetermined wavelength and emits light (dashed arrows) according to a first emission profile as shown in FIG. 4 in the right graph.

As the cell 11a, i.e. the cell wall, has a high refractive index (n=1.7 for $Al_2O_3$) compared to air (n=1), the light is reflected within the pore 13a due to total reflection and finally reaches the first opening at the first surface of the nano-porous membrane 10a where it is emitted in a directional manner. In other words, the confinement within the pore 13a leads to a directional emission from an isotropic emission of the plurality of first quantum dots 20a.

By using a nano-porous membrane 10a, as described herein, as a host matrix a directional emission may be achieved. This means a directed luminescence perpendicular to the membrane surface may be achieved due to total internal reflection of the wavelength-changed incident light.

Accordingly, under photoexcitation a part of the incident blue light is wavelength-changed to green and red light, which may used in a number of different photonic applications.

FIG. 5B schematically illustrates the heat dissipation in a pore 13b in a film 1b, which corresponds to the film 1b of the embodiment shown in FIG. 3B.

During photoexcitation, e.g. under high flux conditions, the quantum dots may heat up, here for illustration purposes only one quantum dot 20a of the plurality of first quantum dots 20a is shown.

When a quantum dot 20a of the plurality of hits the cell wall, the heat may flow through the cell wall to the substrate 15 (here aluminum). Accordingly, the transported heat may be efficiently dissipated through the metallic aluminum substrate 15. This may prevent the heating of the quantum dots 20a at high irradiation flux, which may lead to a luminescence efficiency drop at elevated operation temperature above, for example, 60-80° C.

Therefore, the use of a nano-porous membrane 10b as a host matrix may provide dissipating the generated heat via the cell walls made of alumina, which shows a thermal conductivity with an coefficient of up to 38.5 W/mK.

Figure 6:
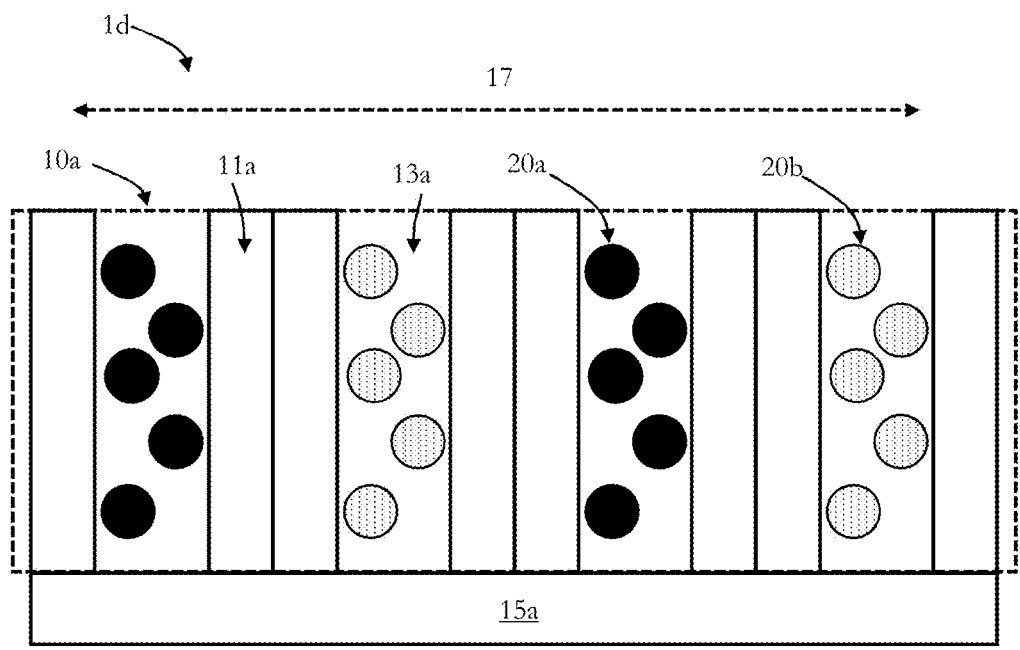
FIG. 6 schematically illustrates in a block diagram a fourth embodiment of a film for changing a wavelength of light.

FIG. 6 schematically illustrates in a block diagram a fourth embodiment of a film 1d for changing a wavelength of light. The same reference signs as in FIGS. 3A and 5 are used for components with basically the same configuration and functionality.

The film 1d has a nano-porous membrane 10a and a substrate 15a. The nano-porous membrane 10a corresponds to the nano-porous membrane 10a of FIG. 3A. The substrate 15a is a glass substrate.

A plurality of first quantum dots 20a and a plurality of second quantum dots 20b are provided in pores 13a of the nano-porous membrane 10a, wherein the plurality of first quantum dots 20a and the plurality of second quantum dots 20b are arranged in an alternating sequence along a direction 17 of a predetermined pattern.

This may provide an effective wavelength-changing layer for directional light emission. For example, a LED, mini-LED, or monolythic micro-LED array may not need an additional color filter array, if the quantum dots are deposited in such an alternating sequence inside the pores 13a of the nano-porous membrane 10a, which may then be deposited on, e.g., an LED array. This may provide RGB subpixels on top of the LED array like in a Bayer filter array.

As mentioned above, this may be realized via ink jet printing or even electrostatic accelerated jetting technologies or a mask in the filling process, which may depend on the required resolution.

Therefore, a thin layer, for example, of <100 μm thickness without reflecting aluminum substrate may be provided (the substrate 15a is optional), so that the film 1d may be put on top of those LED arrays and used in a transmission mode.

Figure 7:
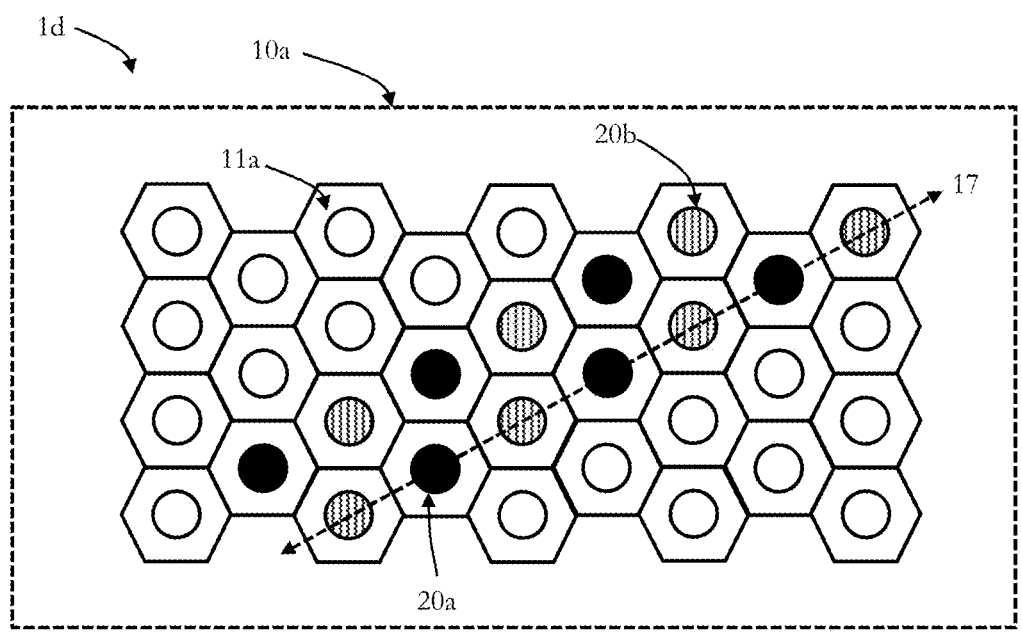
FIG. 7 schematically illustrates the fourth embodiment of a film for changing a wavelength of light in view on a first surface of the film.

FIG. 7 schematically illustrates the fourth embodiment of a film 1d for changing a wavelength of light in view on a first surface of the film 1d. The embodiment is discussed under reference of FIGS. 6 and 7. In FIG. 7, the same reference signs as in FIG. 6 are used for components with basically the same configuration and functionality.

The film 1d of FIG. 7 corresponds to the film 1d of the embodiment of FIG. 6.

The plurality of first and second quantum dots 20a and 20b is provided in a plurality of pores of the nano-porous membrane 10a in the alternating sequence along the direction 17 of the predetermined pattern as shown in FIG. 6.

In other words, the plurality of pores 13a includes a plurality of first pores and a plurality of second pores, wherein the plurality of first quantum dots 20a is provided in the plurality of first pores, the plurality of second quantum dots 20b is provided in the plurality of second pores, and wherein the plurality of first pores and the plurality of second pores is arranged according to the alternating sequence along the direction 17 of the predetermined pattern.

As mentioned above, such a film 1d may be provided on a LED array like in a Bayer filter array.

Figure 8:
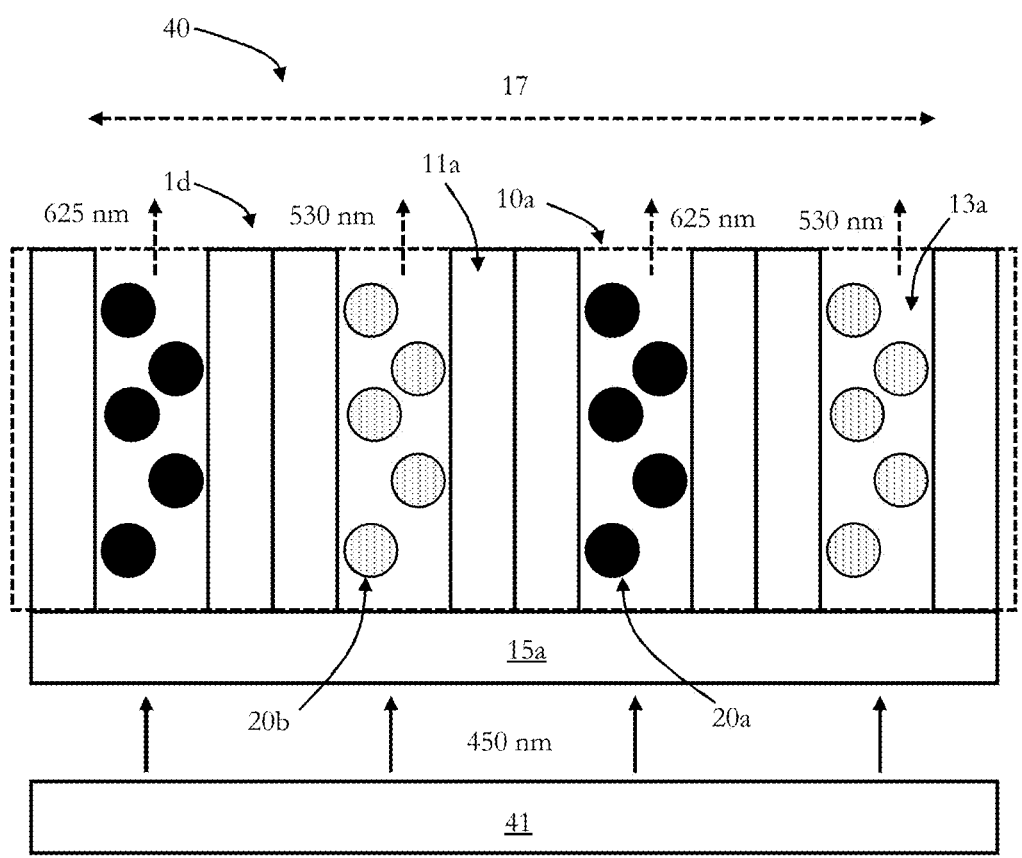
FIG. 8 schematically illustrates in a block diagram an embodiment of an illumination device.

FIG. 8 schematically illustrates in a block diagram an embodiment of an illumination device 40. The embodiment is discussed under reference of FIG. 4, FIG. 6, FIG. 7 and FIG. 8. The same reference signs as in FIG. 6 and FIG. 7 are used for components with basically the same configuration and functionality.

The illumination device 40 has a light source 41, here a LED array, which emits light including at least a predetermined wavelength of about 450 nm (here optical output profile with an emission peak at (about) 450 nm according to FIG. 4).

The film 1d for changing a wavelength of light of the embodiments of FIGS. 6 and 7 is provided on the light source 41 for functioning as a Bayer filter array.

Figure 9:
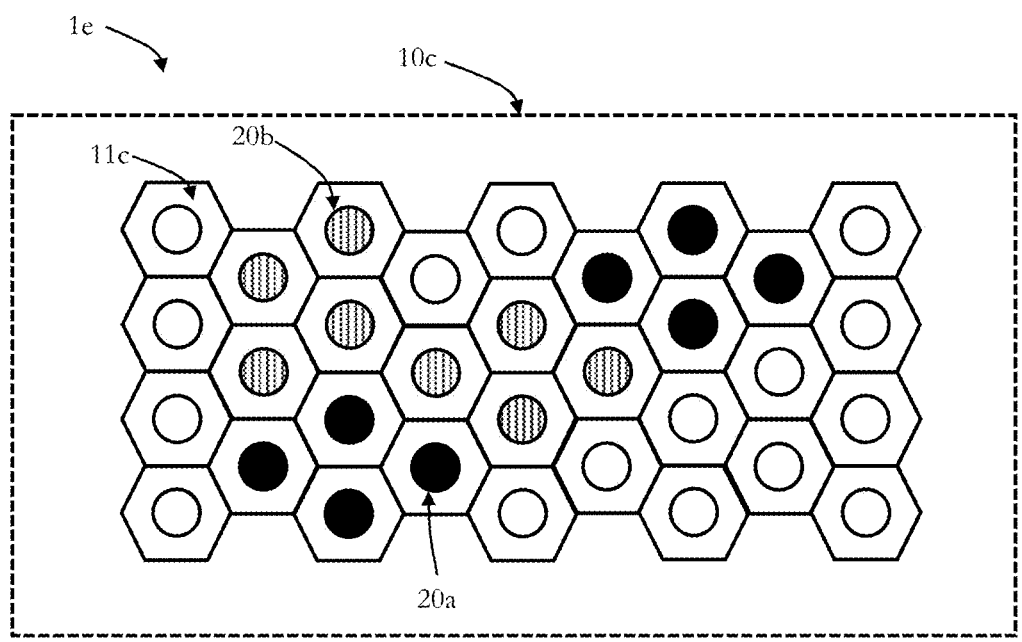
FIG. 9 schematically illustrates a fifth embodiment of a film for changing a wavelength of light in view on a first surface of the film.

FIG. 9 schematically illustrates a fifth embodiment of a film 1e for changing a wavelength of light in view on a first surface of the film 1e. The embodiment is discussed under reference of FIG. 3C and FIG. 9. The same reference signs as in FIG. 3C are used for components with basically the same configuration and functionality.

The film 1e has a nano-porous membrane 10c and a substrate 15 as in the embodiment of FIG. 3C.

A plurality of first quantum dots 20a and a plurality of second quantum dots 20b are provided in the pores 13c of the nano-porous membrane 10c.

The nano-porous membrane 10c has a plurality of first pores, in which the plurality of first quantum dots 20a is provided, and has a plurality of second pores, in which the plurality of second quantum dots 20b is provided, as can be seen in FIG. 9.

Moreover, the plurality of first pores is arranged according to a plurality of first pore groups and the plurality of second pores is arranged according to a plurality of second pore groups, wherein the plurality of first pore groups and the plurality of second pore groups is arranged according to a predetermined sub-pattern of the predetermined pattern.

According to such an arrangement, larger regions in the film 1e, i.e. the nano-porous membrane 10c, containing only one type of quantum dots may be realized, for example, for larger Bayer filter array arrangements in various applications.

Figure 10:
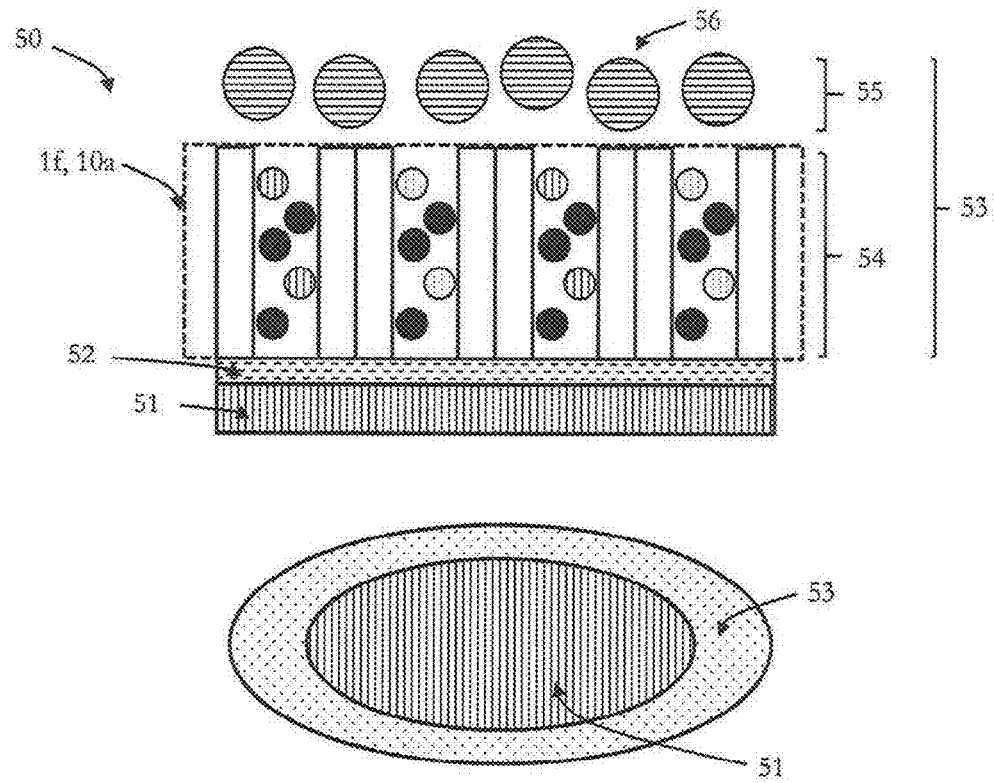
FIG. 10 schematically illustrates in a block diagram an embodiment of a projector color wheel.

FIG. 10 schematically illustrates in a block diagram an embodiment of a projector color wheel 50. The same reference signs as in the other embodiments are used for components with basically the same configuration and functionality.

The projector color wheel 50 has a substrate 51 and a wavelength-changing section 53.

The wavelength-changing section 53 is provided on the substrate 51, wherein the wavelength-changing section 53 is provided as a ring around the substrate 51 as can be seen in FIG. 10.

The substrate 51 of the projector color wheel 50 is glass substrate 51, wherein the substrate is disk-shaped.

The wavelength-changing section has a reflective film 52, a first film 54 and a second film 55 for changing a wavelength of light.

The reflective film is a silver film for reflecting light emitted by the first film 54 and the second film 55.

The first film 54 and the second film 55 are arranged on each other.

The first film 54 has a film 1f for changing a wavelength of light, wherein the film 1f has a nano-porous membrane 10a corresponding to the nano-porous membrane 10a of FIG. 3A. The film 1f is provided without a substrate.

The second film 55 has a phosphor compound, here cerium doped yttrium aluminum garnet 56 (Ce:YAG).

Moreover, each of the first and the second film 54 and 55 have a binding material, here sodium silicate, for attaching the films to each other.

The projector color wheel 50 may be provided in a projector illumination device to generate new colors from light including at least the predetermined wavelength emitted by a light source, wherein the light incidents onto the projector color wheel 50. The generated colors may be used to generate an image projected on a screen.

The projector color wheel 50 may provide better color gamut, more light in a red spectral region, better saturation and thermal behavior, which may be useful in, for example, high power laser illuminated projectors.

Figure 13:
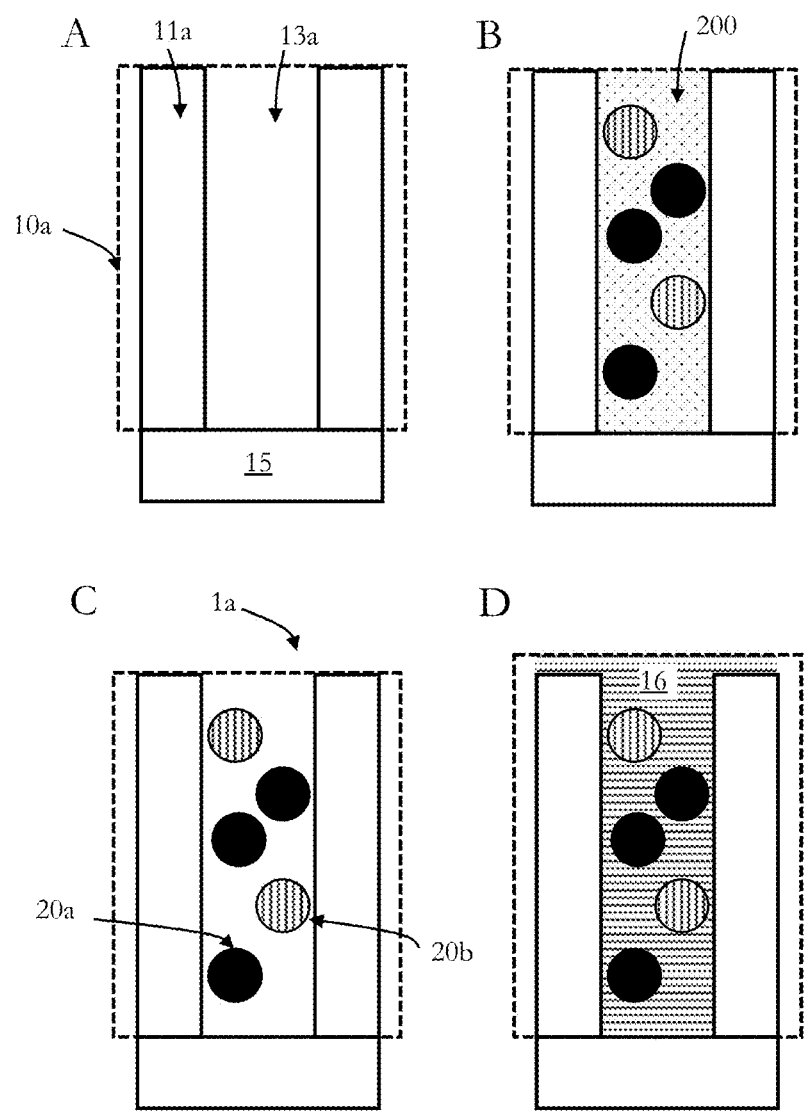
FIG. 13 schematically illustrates in a block diagram an embodiment of a method of manufacturing a film for changing a wavelength.

A method 100 for manufacturing a film 1a for changing a wavelength of light is discussed under reference of FIGS. 12 and 13.

At 101, a nano-porous membrane 10a is formed, including a plurality of pores 13a each having a first opening at a first surface of the nano-porous membrane 10a and each extending in an extension direction towards a second surface of the nano-porous membrane 10a opposite to the first surface of the nano-porous membrane 10a, wherein the plurality of pores 13a is arranged according to a predetermined pattern, as described herein, and which is schematically illustrated in FIG. 13.

The film 1a for changing a wavelength of light has a nano-porous membrane 10a and a substrate 15.

The nano-porous membrane 10a is formed of anodic aluminum oxide and has a plurality of cells 11a (only one cell 11a is shown for illustration purposes). Each cell 11a includes a pore 13a.

The nano-porous membrane 10a is formed from aluminum by two-step-anodization. Afterwards the nano-porous membrane 10a is provided on the substrate 15.

At 102, a plurality of first quantum dots 20a of a first quantum dot type is provided in the plurality of pores 13a, wherein the plurality of first quantum dots 20a is configured to emit light according to a first emission profile with at least a first emission peak at a first emission wavelength when light of a predetermined wavelength incidents, as described herein.

At 103, a plurality of second quantum dots 20b of a second quantum dot type is provided in the plurality of pores 13a, wherein the plurality of second quantum dots 20b is configured to emit light according to a second emission profile with at least a second emission peak at a second emission wavelength when light of the predetermined wavelength incidents, as described herein.

The plurality of first and second quantum dots 20a and 20b, respectively, is manufactured by colloidal synthesis in solution. The resulting quantum dot solution 200 is filled in the pores 13a of the nano-porous membrane 10a.

FIG. 13B schematically illustrates a filling of the pores 13a of the nano-porous membrane 10a with the quantum dot solution 200.

FIG. 13C schematically illustrates an evaporation of a solvent of the quantum dot solution 200 of FIG. 13B after which the plurality of first and second quantum dots 20a and 20b, respectively, is provided in the plurality of pores 13a of the nano-porous membrane 10a.

Accordingly, the film 1a for changing a wavelength of light is obtained after the evaporation of the solvent of the quantum dot solution 200.

Moreover, a filling 16 the plurality of pores 13a with a metal oxide, a metal fluoride or a semiconductor oxide can be optionally performed, as described herein.

FIG. 13D schematically illustrates the filling 16 of the plurality of pores 13a of the nano-porous membrane 10a with a filling material such as a metal oxide or the like.

The filling 16 is inserted by magnetron sputtering.

It should be recognized that the embodiments describe methods with an exemplary ordering of method steps. The specific ordering of method steps is however given for illustrative purposes only and should not be construed as binding. For example, the ordering of 102 and 103 in the embodiment of FIG. 12 may be exchanged. Other changes of the ordering of method steps may be apparent to the skilled person.

Note that the present technology can also be configured as described below.

(1) A film for changing a wavelength of light, including:
  a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
  a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;
  a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
  wherein the first emission wavelength is larger than the second emission wavelength.

(2) The film of (1), wherein each of the plurality of pores has a second opening at the second surface of the nano-porous membrane by extending the respective pore in the extension direction to the second surface of the nano-porous membrane.

(3) The film of (1) or (2), wherein each of the plurality of pores has a pore diameter being substantially constant along the extension direction.

(4) The film of (2) or (3), wherein each of the plurality of pores has a pore diameter getting increasingly smaller from the first opening along the extension direction to the second opening.

(5) The film of (4), wherein the pore diameter of each of the plurality of pores at the second opening is smaller than a dot diameter of each of the plurality of first quantum dots and each of the plurality of second quantum dots.

(6) The film of anyone of (1) to (5), wherein the plurality of pores includes a plurality of first pores and a plurality of second pores and wherein the plurality of first quantum dots is provided in the plurality of first pores and wherein the plurality of second quantum dots is provided in the plurality of second pores.

(7) The film of (6), wherein the plurality of first pores and the plurality of second pores is arranged according to an alternating sequence along a direction of the predetermined pattern.

(8) The film of (6) or (7), wherein the plurality of first pores is arranged according to a plurality of first pore groups and the plurality of second pores is arranged according to a plurality of second pore groups and wherein the plurality of first pore groups and the plurality of second pore groups is arranged according to a predetermined sub-pattern of the predetermined pattern.

(9) The film of anyone of (1) to (8), further including:
a substrate on which the nano-porous membrane is provided; and
wherein the second surface of the nano-porous membrane faces the substrate.

(10) The film of (9), wherein the substrate is a metallic substrate or a transparent substrate.

(11) The film of anyone of (1) to (10), wherein the first and the second quantum dot type each has a structure which includes:
a core layer including a first quantum dot material;
a first shelling layer including a second quantum dot material formed on the core layer; and
an oxide layer including an oxide formed on the first shelling layer.

(12) The film (11), wherein the structure of the first and the second quantum dot type includes:
a second shelling layer including a third quantum dot material formed between the first shelling layer and the oxide layer.

(13) The film of (11), wherein the first quantum dot material is cadmium selenide and the second quantum dot material is cadmium sulfide.

(14) The film of (12), wherein the first quantum dot material is indium phosphide, the second quantum dot material is zinc selenide and the third quantum dot material is zinc sulfide.

(15) The film of anyone of (11) to (14), wherein the oxide is silicon oxide or aluminum oxide.

(16) The film of anyone of (1) to (15), wherein the plurality of pores are filled with a metal oxide, a metal fluoride or a semiconductor oxide.

(17) An illumination device, including:
a light source configured to emit light of at least a predetermined wavelength; and
a film for changing a wavelength of light, provided on the light source, including:
  a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
  a plurality of first quantum dots of a first quantum dot type, provided in the plurality of pores, the plurality of first quantum dots being configured to emit light according to a first emission profile with at least a first emission peak at a first emission wavelength when light of the predetermined wavelength incidents;
  a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
  wherein the first emission wavelength is larger than the second emission wavelength.

(18) A projector color wheel, including:
a substrate;
a reflective film provided on the substrate; and
a first film for changing a wavelength of light, provided on the reflective film, including:
  a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
  a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;
  a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
  wherein the first emission wavelength is larger than the second emission wavelength.

(19) The projector color wheel of (18), further including:
a second film for changing a wavelength of light, provided on the first film, including a phosphor compound, the phosphor compound being configured to emit light according to a third emission profile with at least a third emission peak at a third emission wavelength when light of the predetermined wavelength incidents; and
wherein each of the first film and the second film includes a binding material.

(20) A method of manufacturing a film for changing a wavelength of light, including:
forming a nano-porous membrane including a plurality of pores each having a first opening at a first surface of the nano-porous membrane and each extending in an extension direction towards a second surface of the nano-porous membrane opposite to the first surface of the nano-porous membrane, wherein the plurality of pores is arranged according to a predetermined pattern;
providing a plurality of first quantum dots of a first quantum dot type in the plurality of pores, the plurality of first quantum dots being configured to emit light according to a first emission profile with at least a first emission peak at a first emission wavelength when light of a predetermined wavelength incidents;
providing a plurality of second quantum dots of a second quantum dot type in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

The invention claimed is:

1. A film for changing a wavelength of light, comprising:
a nano-porous membrane including a plurality of pores each having a first opening at a first surface of the nano-porous membrane and each extending in an extension direction towards a second opening in a second surface of the nano-porous membrane opposite to the first surface of the nano-porous membrane and having a pore diameter that is increasingly smaller from the first opening along the extension direction to the second opening, wherein the plurality of pores is arranged according to a predetermined pattern;
a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;
a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
wherein the first emission wavelength is larger than the second emission wavelength.

2. The film according to claim 1, wherein the pore diameter of each of the plurality of pores at the second opening is smaller than a dot diameter of each of the plurality of first quantum dots and each of the plurality of second quantum dots.

3. The film according to claim 1, wherein the plurality of pores includes a plurality of first pores and a plurality of second pores and wherein the plurality of first quantum dots is provided in the plurality of first pores and wherein the plurality of second quantum dots is provided in the plurality of second pores.

4. The film according to claim 3, wherein the plurality of first pores and the plurality of second pores is arranged according to an alternating sequence along a direction of the predetermined pattern.

5. The film according to claim 3, wherein the plurality of first pores is arranged according to a plurality of first pore groups and the plurality of second pores is arranged according to a plurality of second pore groups and wherein the plurality of first pore groups and the plurality of second pore groups is arranged according to a predetermined sub-pattern of the predetermined pattern.

6. The film according to claim 1, further comprising:
a substrate on which the nano-porous membrane is provided; and
wherein the second surface of the nano-porous membrane faces the substrate.

7. The film according to claim 6, wherein the substrate is a metallic substrate or a transparent substrate.

8. The film according to claim 1, wherein the first and the second quantum dot type each has a structure which includes:

a core layer including a first quantum dot material;
a first shelling layer including a second quantum dot material formed on the core layer; and
an oxide layer including an oxide formed on the first shelling layer.

9. The film according to claim 8, wherein the structure of the first and the second quantum dot type includes:
a second shelling layer including a third quantum dot material formed between the first shelling layer and the oxide layer.

10. The film according to claim 8, wherein the first quantum dot material is cadmium selenide and the second quantum dot material is cadmium sulfide.

11. The film according to claim 9, wherein the first quantum dot material is indium phosphide, the second quantum dot material is zinc selenide and the third quantum dot material is zinc sulfide.

12. The film according to claim 8, wherein the oxide is silicon oxide or aluminum oxide.

13. The film according to claim 1, wherein the plurality of pores are filled with a metal oxide, a metal fluoride or a semiconductor oxide.

14. An illumination device, comprising:
a light source configured to emit light of at least a predetermined wavelength; and
a film for changing a wavelength of light, provided on the light source; including:
a nano-porous membrane including a plurality of pores each having a first opening at a first surface of the nano-porous membrane and each extending in an extension direction towards a second opening in a second surface of the nano-porous membrane opposite to the first surface of the nano-porous membrane and having a pore diameter that is increasingly smaller from the first opening along the extension direction to the second opening, wherein the plurality of pores is arranged according to a predetermined pattern;
a plurality of first quantum dots of a first quantum dot type, provided in the plurality of pores, the plurality of first quantum dots being configured to emit light according to a first emission profile with at least a first emission peak at a first emission wavelength when light of the predetermined wavelength incidents;
a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and
wherein the first emission wavelength is larger than the second emission wavelength.

15. A projector color wheel, comprising:
a substrate;
a reflective film provided on the substrate; and
a first film for changing a wavelength of light, provided on the reflective film, including:
a nano-porous membrane including a plurality of pores each having a first opening at a first surface of the nano-porous membrane and each extending in an extension direction towards a second opening in a second surface of the nano-porous membrane opposite to the first surface of the nano-porous membrane and having a pore diameter that is increasingly smaller from the first opening along the extension direction to the second opening, wherein the plurality of pores is arranged according to a predetermined pattern;

a plurality of first quantum dots of a first quantum dot type, provided in the plurality of pores, the plurality of first quantum dots being configured to emit light according to a first emission profile with at least a first emission peak at a first emission wavelength when light of a predetermined wavelength incidents;

a plurality of second quantum dots of a second quantum dot type, provided in the plurality of pores, the plurality of second quantum dots being configured to emit light according to a second emission profile with at least a second emission peak at a second emission wavelength when light of the predetermined wavelength incidents; and wherein the first emission wavelength is larger than the second emission wavelength.

16. The projector color wheel according to claim 15, further comprising a second film for changing a wavelength of light, provided on the first film, including a phosphor compound, the phosphor compound being configured to emit light according to a third emission profile with at least a third emission peak at a third emission wavelength when light of the predetermined wavelength incidents; and wherein each of the first film and the second film includes a binding material.

17. The projector color wheel according to claim 15, wherein the pore diameter of each of the plurality of pores at the second opening is smaller than a dot diameter of each of the plurality of first quantum dots and each of the plurality of second quantum dots.

18. The illumination device according to claim 14, wherein the pore diameter of each of the plurality of pores at the second opening is smaller than a dot diameter of each of the plurality of first quantum dots and each of the plurality of second quantum dots.

* * * * *